A. J. SCHINDLER.
Devices for Turning Locomotive Crank Pins.

No. 155,262. Patented Sept. 22, 1874.

UNITED STATES PATENT OFFICE.

ANDREW J. SCHINDLER, OF HORNELLSVILLE, NEW YORK.

IMPROVEMENT IN DEVICES FOR TURNING LOCOMOTIVE CRANK-PINS.

Specification forming part of Letters Patent No. 155,262, dated September 22, 1874; application filed August 29, 1874.

*To all whom it may concern:*

Be it known that I, ANDREW J. SCHINDLER, of Hornellsville, in the county of Steuben and State of New York, have invented a new and Improved Locomotive-Crank Turner, of which the following is a specification:

My invention consists of a tool-carrier, which I call a quartering-tool, mounted on a boring-bar, which is arranged in such relation to the center of a lathe for turning and boring locomotive-wheels that, when the wheel is centered in the lathe, the quartering-tool will, by being revolved and fed along by the boring-bar, turn off the crank-pin exactly parallel with the axis of the wheel, whether the wheel itself be true or not, which cannot be done by the crank-turning devices which clamp on the crank-pin or its hub, or the same and the wheel, in case the crank be bent or the wheel warped, which often happens.

Figure 1:
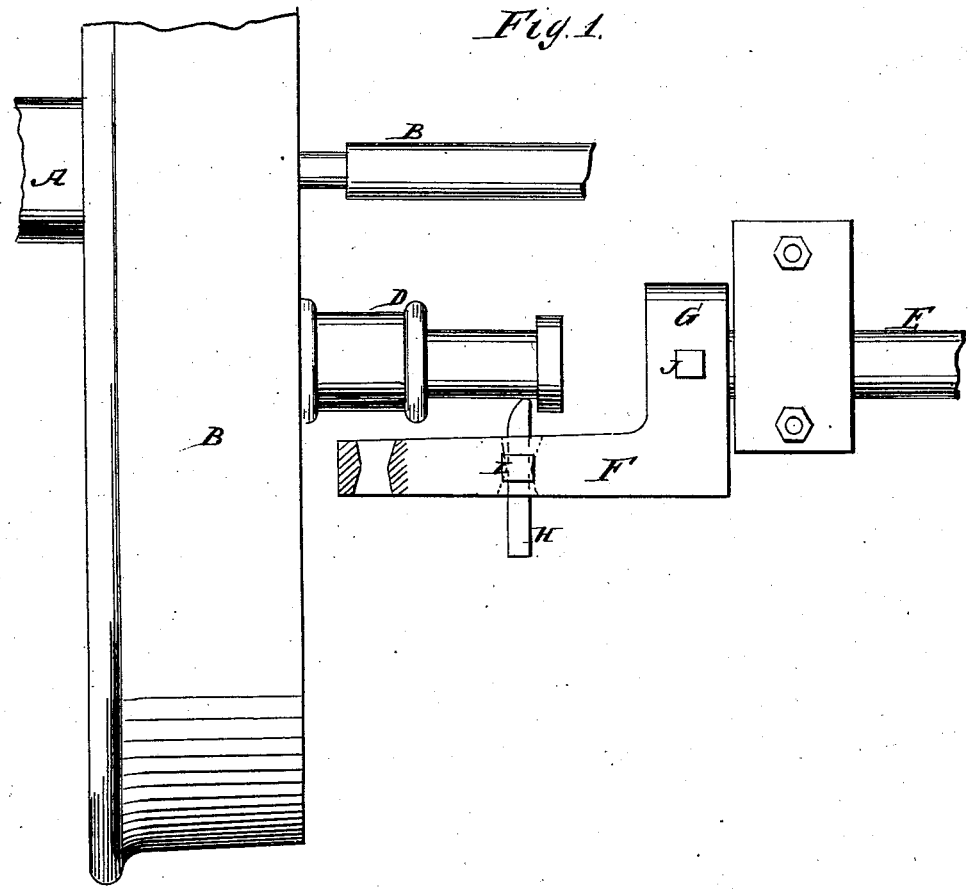
Figure 2:
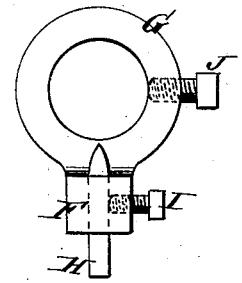

Figure 1 is a side elevation of some parts of a lathe and part of a wheel, showing the plan of my invention; and Fig. 2 is an end elevation of my improved quartering-tool.

Similar letters of reference indicate corresponding parts.

A and B represent the centers of the lathe, coinciding with the axis of the crank-wheel B, on which is the crank-pin D to be turned. E represents a bar or shaft contrived in bearings, and with feeding devices similar to a boring-bar, and arranged as much to one side of the axis or centers of the lathe as the length of the crank, but exactly parallel thereto, and geared so as to be revolved in any approved way for carrying the tools around the crank-pin. To this bar I attach what I call the quartering-tool, the same being the tool-carrier F, consisting of a strong bar with a socket-piece, G, at one end, which is turned at right angles to fit on the end of the shaft E and be secured thereon for carrying the bar F, in which the turning-tools H—one or more—are fitted and fastened by set-screws I or other means. The quartering-tool is fastened on the shaft E by set-screw J. The tools are contrived so that they can be shifted right or left, as may be needed in their application to the crank-pin.

When a double crank-pin is to be turned the bar F will carry two tools, but for a single pin only one will be used.

Having thus described my invention, I claim as new and desire to secure by Letters Patent—

The tool-carrier F, mounted on a revolving and feeding bar, E, arranged relatively to the centers of a wheel turning and boring lathe, substantially as specified.

ANDREW J. SCHINDLER.

Witnesses:
WILLIAM GRAY,
MANSON F. ROGERS.